Figure 1:
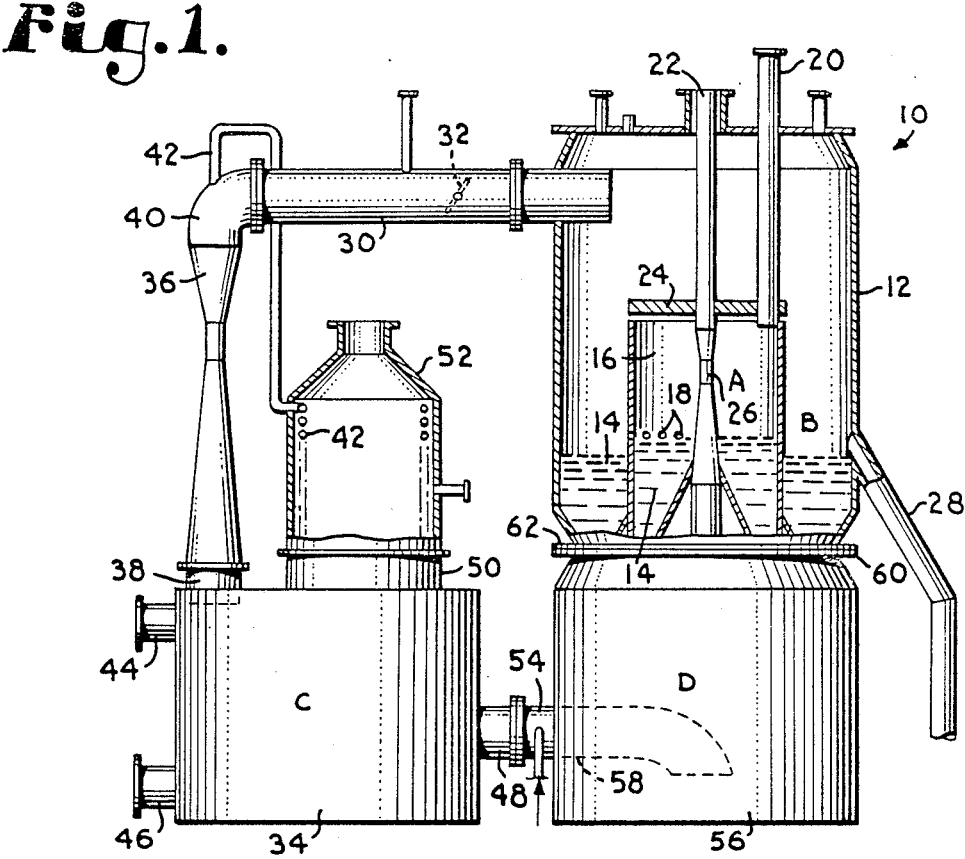

United States Patent [19]

Lonsinger et al.

[11] Patent Number: 4,957,721
[45] Date of Patent: Sep. 18, 1990

[54] PROCESS FOR REGENERATION OF ACTIVATED CARBON

[76] Inventors: Jack J. Lonsinger; Deborah A. Lonsinger, both of 508 Clayview Dr., Liberty, Mo. 64068

[21] Appl. No.: 212,610

[22] Filed: Jun. 28, 1988

[51] Int. Cl.$^5$ .............................................. C01B 31/02
[52] U.S. Cl. ................................. 423/461; 423/449; 423/460; 502/55; 502/416
[58] Field of Search ....................... 423/449, 460, 461; 502/55, 416

[56] References Cited

U.S. PATENT DOCUMENTS

| | | | |
|---|---|---|---|
| 2,501,700 | 3/1950 | Stuart | 502/55 |
| 2,692,656 | 10/1954 | Berg | 502/55 |
| 2,933,454 | 4/1960 | Repik et al. | 423/449 |
| 2,966,447 | 12/1960 | Walter | 423/460 |
| 3,153,633 | 10/1964 | Von Dreusche, Jr. | 502/55 |
| 3,801,514 | 4/1974 | Joseph | 502/55 |
| 3,804,581 | 4/1974 | Schmalfeld et al. | 502/55 |
| 3,852,216 | 12/1974 | Ninemiya et al. | 423/449 |
| 4,008,994 | 2/1977 | Numasaki et al. | 502/55 |
| 4,107,084 | 8/1978 | Repik et al. | 502/55 |
| 4,131,565 | 12/1978 | Komeri et al. | 502/55 |
| 4,221,560 | 9/1980 | Idei et al. | 423/460 |
| 4,248,706 | 2/1981 | Repik | 502/55 |
| 4,338,198 | 7/1982 | Brown | 502/55 |
| 4,347,156 | 8/1982 | Lembana et al. | 502/55 |
| 4,374,092 | 2/1983 | Marquess et al. | 502/55 |

FOREIGN PATENT DOCUMENTS

| | | | |
|---|---|---|---|
| 2613518 | 10/1976 | Fed. Rep. of Germany | 423/461 |
| 3222153 | 12/1983 | Fed. Rep. of Germany | 423/460 |
| 2577148 | 8/1986 | France | 502/55 |
| 53-86697 | 7/1978 | Japan | 423/460 |
| 56-129605 | 10/1981 | Japan | 423/461 |

Primary Examiner—Olik Chaudhuri
Assistant Examiner—Robert M. Kunemund
Attorney, Agent, or Firm—Kokjer, Kircher, Bradley, Wharton, Bowman & Johnson

[57] ABSTRACT

A method and apparatus for reactivating spent granular activated carbon is the subject of this invention. The carbonaceous material is to be activated is fed to a drying zone where it is dried until incoming air and recycle gases fluidize the drying zone thus causing the dried material to be pneumatically conveyed to the regeneration or activation zone. In this zone, the temperature is raised to effect the oxidizing reactions thereby volatilizing at least some of the contaminants while converting residual carbon to carbon monoxide and hydrogen. Some of the produce gases from the drying and regeneration zones are utilized to fluidize both of these zones and the remaining gases are directed to the afterburner where combustibles are consumed. The product gases from the afterburner are then directed to a conditioning zone where combustible fuel is introduced so as to consume any residual oxygen. The conditioned gas is then recycled to the regeneration zone where it fluidizes the regenerated produce which is then pneumatically conveyed out of the regenerator container.

13 Claims, 1 Drawing Sheet

PROCESS FOR REGENERATION OF ACTIVATED CARBON

This invention relates generally to carbon activation and, more particularly, to a method and apparatus for activating carbonaceous material by removing volatile components.

Activated carbon is any of various forms of carbonaceous material which is characterized by high adsorptivity for gases, liquids and solids. The carbon is typically produced by destructive distillation at high temperatures. The carbonaceous material is also granularized so as to increase its potential uses and for handling convenience. The activated carbon is useful for removal of contaminants from both gases and liquids. It can also be utilized for the decolorization and treatment of water.

Many industrialized uses of activated carbon employ techniques for regenerating the spent carbon by removing water and adsorbate.

In a typical carbon regeneration process, the water is removed by vaporization and the adsorbate is then pyrolyzed to produce volatiles and fixed carbon which remains on the activated carbon. The fixed carbon residue is then removed by chemical reaction, normally the well known water gas reaction where the carbon combines with water at high temperature to produce carbon monoxide and hydrogen.

The off gas from a typical regeneration procedure normally contains a significant percentage of combustible organic compounds which are directed to an afterburner where they are converted to carbon dioxide, water and acid gases which can be removed with a conventional scrubber.

It is known in the art to recycle some of the off gases from the afterburner so as to reduce energy requirements for the system. Following the teachings of the prior art, however, it has heretofore been recognized that the off gases from the afterburner cannot be recycled to the activation or regeneration zone because the presence of oxygen in this gas stream will result in unacceptable charring of the carbon being activated.

The present invention provides for the complete recycle of off gases from the afterburner in an unrestricted manner throughout a carbon reactivation system thereby reducing energy requirements, while at the same time providing many other advantages to the operating system.

It is, therefore, a primary object of the present invention to provide a system for activating carbonaceous material wherein off gas from the afterburner is recycled through the entire system including the activation and drying zones thereby substantially reducing the quantity of fuel consumed to maintain operating temperatures.

As a corollary to the above object, it is an important aim of our invention to provide for complete recycle of off gases from the afterburner with the recycled gas being conditioned by first utilizing the oxydizable adsorbates to consume any oxygen present and then utilizing an outside fuel source as a reductant to consume any remaining oxygen thus substantially precluding any possibility of charring of the carbonaceous material being activated.

Another one of the objectives of this invention is to provide a method and apparatus for complete recycle of off gases from the afterburner of a carbon regenerating system whereby substantially all of the off gases are recycled through the entire system thereby reducing the volume of outside air which in turn reduces the volume of air passing through the pollution control equipment prior to being released to the atmosphere.

Another aim of this invention is to provide a method and apparatus for the regeneration of activated carbon which provides for the complete recycle of off gases from the incinerator or afterburner throughout the entire system thereby allowing operating temperatures to be lowered and reducing the deterioration of equipment from heat fatigue and providing greater flexibility in selection of materials for the apparatus.

An objective of this invention is also to provide a method and apparatus for the regeneration of activated carbon with reduced operating temperatures as a result of providing for the complete recycle of off gases from the afterburner thereby greatly reducing the opportunity for charring of the carbonaceous material in the activation zone.

Another important aim of our invention is to provide a method and apparatus for the regeneration of spent activated carbon wherein off gases from the afterburner are recycled throughout the entire system and the system may be driven entirely by fluid pressure thus making the system adaptable to the utilization of fluidized beds which are less expensive to install and operate than other types of conveying equipment.

As a corollary to the foregoing aim, an objective of the invention is to provide a system for carbon reactivation wherein the fluidized beds employed have relatively low depth to diameter ratios so that pressure drop across the bed is minimized and the need for costly air locks is dependably overcome.

Still another object of our invention is to provide a method and apparatus for reactivation of spent wet activated carbon utilizing recycle of afterburner combustion gases through the entire system and whereby substantially all of the water required for the regeneration reaction is obtained from the vaporization of water from the wet carbon feed thus eliminating the need for outside water sources.

Figure 2:
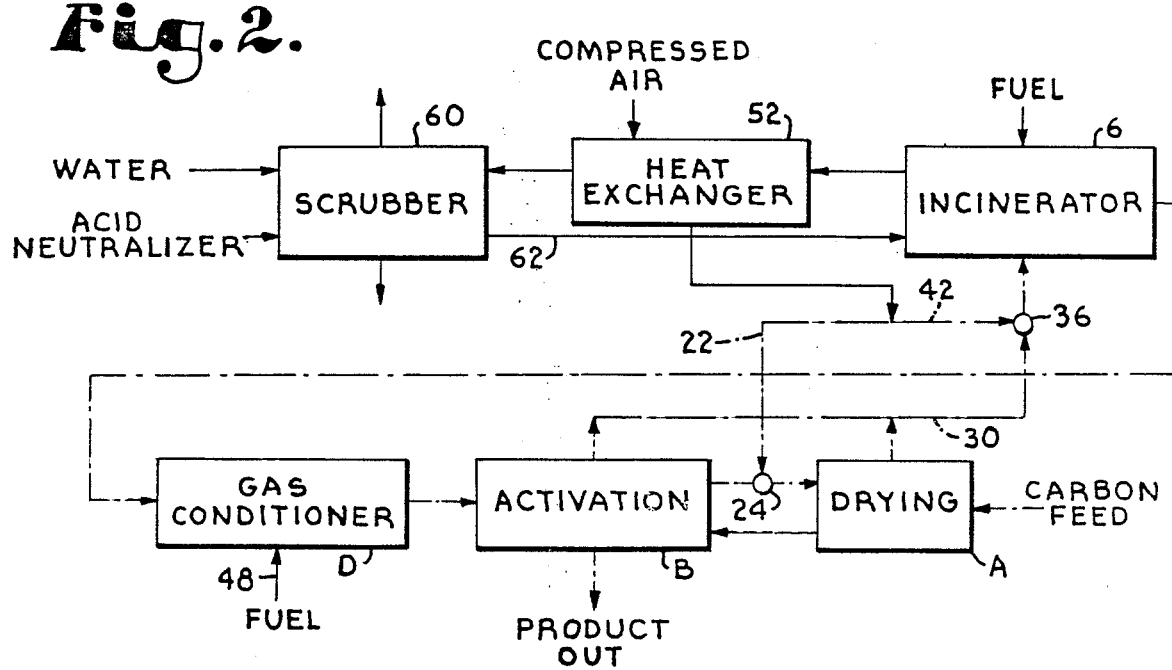

Other objects of the invention will be made clear or become apparent from the following description and claims when read in light of the accompanying drawing, wherein:

FIG. 1 is a side elevational view of the apparatus according to the present invention with portions broken away and shown in cross-section for purposes of illustration; and FIG. 2 is a flow diagram for the method and apparatus of the present invention.

Referring initially to FIG. 1, the equipment of the invention is designated generally by the numeral 10. A relatively large closed container 12 contains carbonaceous material 14 to be activated or regenerated as the case may be. Inside of container 12 is a smaller diameter open top container 16 having a plurality of openings 18 in the container sidewall, the openings 18 being spaced upwardly from the bottom of the smaller container. A conduit 20 extends through the top of container 12 and is in communication with the interior of container 16. This conduit directs the carbonaceous material to be dried to the interior of container 16. Also in communication with the interior of container 16 is a conduit 22. Conduit 22 is coupled with a mixing T 24 approximately midway along its length, the mixing T being designed to intake gases from the interior of container 12. Conduit 22 is also coupled with a venturi section 26 downstream from the mixing T and upstream from the conduit outlet which is spaced just above the bottom of the smaller container 16. An outlet conduit 28 is in communication with the interior of container 12 and provides a route for the exit of product which has been regenerated. Manifestly, the interior of container 16 presents a drying zone A and the interior of container 12 which is outside of container 16 presents an activation or regeneration zone B.

Coupled with the interior of container 12 near the top of the latter is a gas recycle plenum 30, the flow of gases therethrough being controlled by a butterfly valve 32. Gas flows from container 12 through plenum 30 to an incinerator or afterburner 34. Disposed between plenum 30 and incinerator 34 is a venturi section 36 that extends from a coupling section 38 atop incinerator 34 to a plenum elbow 40 that is coupled with the main plenum section 30. A smaller conduit 42 is in communication with the plenum elbow 40 for introducing compressed air into the system. The afterburner or incinerator 34 includes side opening outlet ports 44 and 46 one of which houses a startup burner (not shown) and the other of which is coupled with an auxiliary fuel supply line.

Incinerator 34 has a first outlet port 48 which is disposed on the side opposite ports 44 and 46 and a second outlet which is presented by a short stack 50. The afterburner zone presented by incinerator 34 has been designated by the letter C in the drawing. Stack 50 is in communication with a heat exchanger 52 through which air lines 22 and 42 preferably run to preheat air being injected into the system. It is to be understood that the output from heat exchanger 52 would normally pass through a scrubber device (not shown) for the purpose of final cleanup before release to the atmosphere.

The outlet presented by port 48 of incinerator 34 is coupled with an intake port 54 of a closed container 56 which sits beneath container 12 and is in communication with the latter as will be more fully explained hereinafter. A fuel line 58 is in communication with intake port 54. Container 56 presents a conditioning zone D where the off gases from incinerator 34 are burned in the presence of a fuel so that the latter may consume any residual oxygen that is present prior to these gases being returned to the regeneration zone B. In this regard, it is to be understood that the conditioning zone D is in fluid communication with the regeneration zone B which may be accomplished by having top 60 of container 56 and bottom 62 of container 12 perforated in the area between the outside wall of container 16 and the inside wall of container 12. Other suitable distributors may be employed for coupling the conditioning zone with the regeneration zone.

In operation, the aforedescribed apparatus is particularly useful for the regeneration of wet spent carbon containing various volatile components. It is to be understood that the startup burner is first activated to bring the temperature to about 650° C. before carbonaceous material is introduced. With reference to the schematic drawing of FIG. 2 as well as FIG. 1, the process contemplates that, after minimum operating temperature has been reached, granular carbonaceous material will be auger fed from a slurry tank to drying zone A presented by container 16. The drying zone should be maintained at a temperature within the range of from about 100° C. to about 700° C. and preferably within the range of from about 250° C. to about 550° C. The most preferred temperature range for the dryer is about 350° C. to about 450° C. During this step, all of the water is removed from the product with the water vapor rising through the open top and entering the confines of container 12 before being drawn into plenum 30 by the pressure head created in venturi section 36. Some of the combustibles will also be oxidized in the dryer. It is to be understood that the material 14 forms a fluidized bed inside of container 16 as a result of the air and recycle gases that are introduced through conduit 22, mixing T 24, and venturi section 26. As the material becomes sufficiently dried it will, under the influence of the fluidized bed, pass out of the container through openings 18 and enter the regeneration zone B.

In the regeneration zone, the granular carbon 14 is again fluidized as a result of the action of gases moving from gas conditioning zone D to the reactivation zone B. In the reactivation zone, the predominant reaction for activation of the carbon particles is:

$$C + H_2O \rightarrow CO + H_2$$

In many instances sufficient water vapor is removed in the drying zone and recycled to the activation zone to supply all of the water needed to support the foregoing reaction. If additional make up water is needed this can be provided. This reaction is endothermic requiring a substantial input of energy. The temperature in the reactivation zone will normally be maintained within a range of from about 500° C. to about 1100° C. and preferably within the range of about 700° C. to about 900° C. The most preferable temperature range for the reactivation zone is between about 775° C. and 800° C. Since substantially all oxygen has been removed from the gases leaving the conditioning zone D, the oxidation reaction which sometimes occur in carbon regeneration is substantially precluded, thus avoiding deterioration the carbonaceous material. It has been determined that a residence time for the carbonaceous material in activation zone B of about 20 minutes produces an acceptable regenerated product.

The off gases from drying zone A and activation zone B pass through plenum 30 and are mixed with compressed air in venturi section 36 which acts as a second mixing device similar to the mixing action which occurs in T 24 and venturi 26.

The recycle gases are introduced into incinerator-afterburner 34 where additional outside fuel is utilized as needed to maintain an operating temperature of between about 600° C. and about 1200° C., preferably within the range of about 700° C. to about 1000° C. Most preferably, the temperature range in the incineration zone C will be between about 750° C. and about 850° C. Fuel oxidation of any remaining combustibles thus occurs and the oxygen content of gases leaving the incineration zone will normally need to be no more than about 1.0%.

After leaving incinerator 34, the product gases enter container 56 where they are conditioned as a result of the addition of combustible fuel which acts as a reductant to consume any remaining oxygen. The temperature in the gas conditioning zone D is maintained within a range of about 600° C. to about 1200° C., preferably within the range of from about 700° C. to about 900° C. The most preferred temperature range for conditioning zone D is the range of from about 775° C. to 825° C. The gases leaving conditioning zone D will normally be substantially free of all residual oxygen. Upon recycling of the conditioned gas from container 56 to container 12, the cycle is completed.

Manifestly, off gases from activation zone B are also channeled into plenum 30 where they are mixed with recycle gases from dryer 10 and compressed air in venturi section 36. As previously explained, it is desirable for the off gases from incinerator 34 to pass through heat exchanger 52 for heat exchange with incoming compressed air before these gases are passed on to a scrubber 60 and then being released to the atmosphere. It will be appreciated by those skilled in the art that water and acid neutralizer may be introduced into scrubber 60 as required to present an environmentally acceptable discharge coming from the scrubber.

The process and equipment of the present invention can be utilized for reactivating carbon which has been contaminated with various substances including, but not limited to, the following contaminants: aliphatic amines, aromatic hydrocarbons, chlorinated aliphatics, agricultural and pharmaceutical chemicals, chlorinated aromatics, and various carbohydrate contaminates.

The following example is illustrative of a typical regeneration process utilizing the present invention:

EXAMPLE 74.8 lbs (dry weight) of saturated, spent activated granular carbon (density 37.6 lbs/cu. ft. dry weight) was auger fed to drying zone A at a rate of about 0.51 pounds per minute where a temperature of about 560–590° C. was maintained. A residence time of about six minutes was allowed to completely dry the material. The pressure in the drying zone was about −3.5 inches of water column. As the material was dried, the fluidization of it caused it to move from the drying zone to the regeneration zone of the equipment which was maintained at about 770–790° C. The residence time of the material in the regeneration zone was about twenty minutes. The pressure in the regeneration zone was about −4.0 inches water column. Fifty p.s.i. air was introduced into the primary mixing chamber ahead of the afterburner to maintain a sufficient pressure head to move the entire volume of gases through the system and to fluidize the regenerating zone. The compressed air entering the dryer mixing tee was adjusted to maintain good fluidizing conditions within the dryer. The afterburner/incinerator temperature was maintained at about 840–885° C. with a pressure of about −1 inch water column. Propane was added to the conditioning zone to maintain the temperature within this zone at about 760–770° C. after temperature adjustment. The pressure in this zone was observed at −1.5 inches water column.

After 146 minutes, 174 pounds of compressed air at 440° C. had been added to the drying and incineration zones and approximately 1.6 pounds of propane had been burned in the conditioning zone. This resulted in the consumption of 73115 BTUs to complete the regeneration of the above quantity of carbon or a total input of 977 BTUs per pound of spent activated carbon (dry weight basis).

It should also be understood that gas from scrubber 60 (FIG. 2) may be directed to incinerator 6 via a line 62 for the purpose of temperature control if some cooling is needed. Likewise, this same cooling gas could be recycled to container 56 if some cooling is required in the gas conditioning zone D. In some cases it will not be necessary to add auxiliary fuel to the incinerator-afterburner as there are usually sufficient combustibles in the recycle gas to maintain the operating temperature. It is also within the scope of the invention to join the gas conditioning zone D with the feed to incineration zone C via a slip stream (not shown) so as to condition gas with the same combustibles as are entering the incineration zone.

While the invention has been particularly described and is most advantageously carried out utilizing fluidized beds and pneumatic conveying, it is also within the scope of the invention to utilize, among other devices, a rotary kiln dryer the input end of which serves as the drying zone with the output end presenting the activation or regeneration zone.

We claim:

1. A process for activating carbonaceous material having volatile and nonvolatile contaminants, said process comprising:
   (A) providing an activation zone wherein the reaction $C + H_2O \rightarrow CO + H_2$ occurs;
   (B) providing immediately adjacent said activation zone a drying zone to which gases from said activation zone are directed to remove water from said material;
   (C) providing a gas incineration zone removed from the downstream of both said regeneration and drying zones;
   (D) feeding a carbonaceous material to be activated to said drying zone;
   (E) drying said material to remove said volatiles and substantially all of said water;
   (F) moving said dried material directly to said activation zone without further processing;
   (G) raising the temperature in said activation zone while supplying sufficient water to effect said reaction and to volatilize and oxidize at least some of the contaminants;
   (H) directing the off gases and water vapor from steps (E) and (G) to a mixing zone where they are mixed with air;
   (I) incinerating the output from step (H) to effect oxidation of said volatilized contaminants;
   (J) directing said incinerated output from step (I) to a conditioning zone;
   (K) conditioning the output from step (I) by adding to said step (I) output fuel which when burned acts as a reductant to consume any residual oxygen present; and
   (L) returning the conditioned gas from step (I) to said activation zone.

2. A process as set forth in claim 1, wherein the step of supplying water to said activation zone includes directing water vapor from said drying step to said activation zone.

3. A process as set forth in claim 2, wherein said feeding step comprises feeding a water saturated carbonaceous material thereby producing during step (B) substantially all of the water vapor required for step (D).

4. A process as set forth in claim 2, wherein said moving step includes pneumatically conveying said material.

5. A process as set forth in claim 1, wherein step (H) includes providing air under sufficient pressure to move the water vapor from step (E) and the gaseous products from step (G) through the remaining process steps.

6. A process as set forth in claim 1, wherein step (E) includes fluidizing said material with air under pressure and step (F) includes pneumatically conveying said dried material.

7. A process as set forth in claim 6 wherein step (H) includes adding a volume of air under pressure sufficient to fluidize the material in said activation zone when the conditioned gas from step (H) is returned thereto.

8. A process as set forth in claim 1, wherein step E includes maintaining the temperature within the range of about 100° to 700° C., step G includes maintaining the temperature within the range of about 500° to 1100° C., step I includes maintaining the temperature within the range of about 600° to 1200° C., and step K includes maintaining the temperature within the range of about 600° to 1200° C.

9. A process as set forth in claim 1, wherein said carbonaceous material is spent activated carbon.

10. A process as set forth in claim 9, wherein said spent carbon has been water saturated prior to said feeding step.

11. A process as set forth in claim 10 wherein said moving step includes pneumatically conveying said material.

12. A process as set forth in claim 11, wherein said pneumatic conveying step includes providing air under pressure to fluidize said material.

13. A process as set forth in claim 9, wherein step (E) includes maintaining the temperature within the range of about 100° to 700° C., step (G) includes maintaining the temperature within the range of about 500° to 1100° C., step (I) includes maintaining the temperature within the range of about 600° to 1200° C., and step (K) includes maintaining the temperature within the range of about 600° to 1200° C.

* * * * *